W. V. TURNER.
ELECTROPNEUMATIC BRAKE.
APPLICATION FILED FEB. 23, 1915.

1,185,738.

Patented June 6, 1916.
2 SHEETS—SHEET 1.

WITNESSES
H. W. Crowell
G. M. Clements

INVENTOR
Walter V. Turner
by Wm. M. Cady
Att'y.

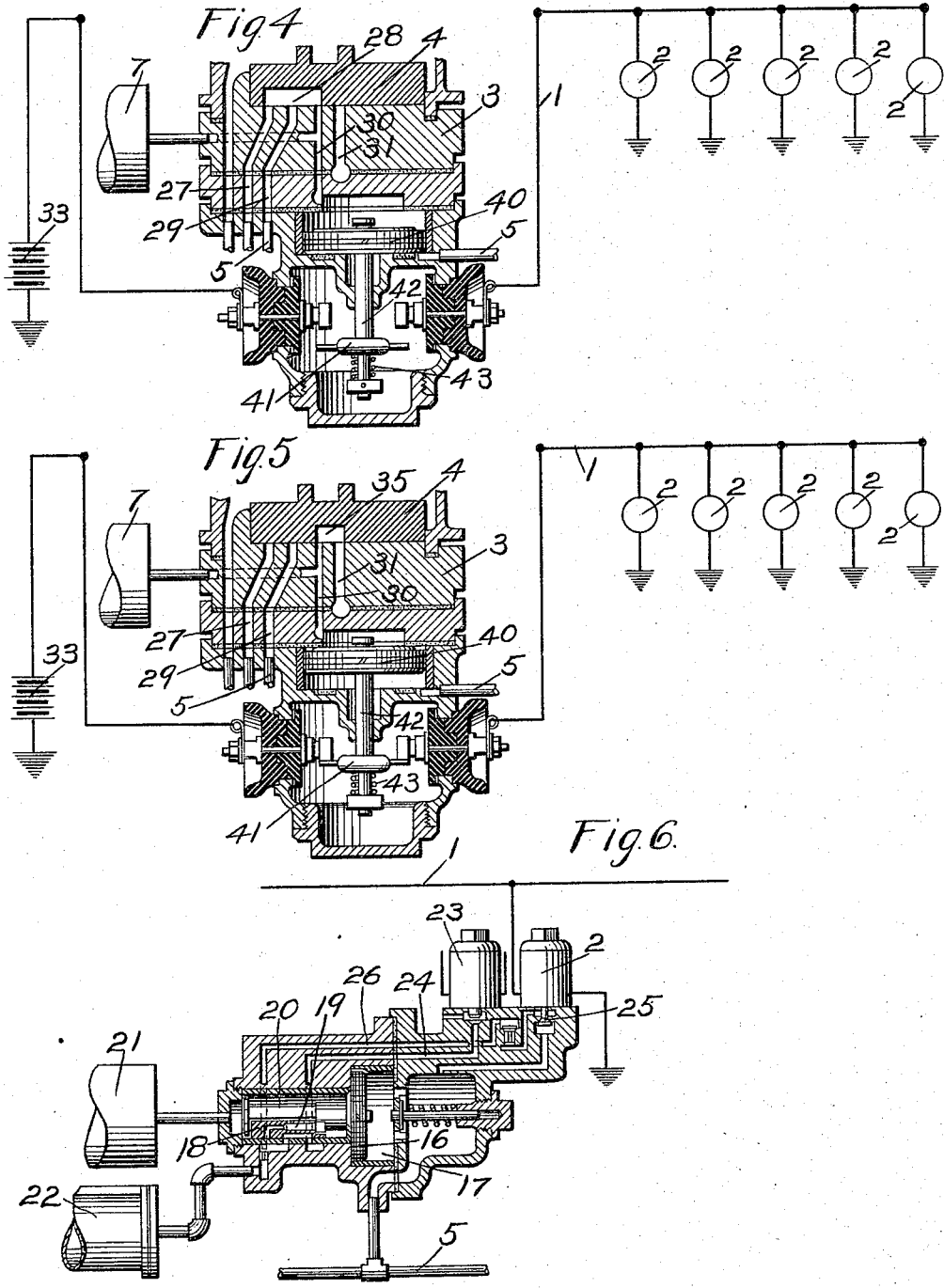

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,185,738.  Specification of Letters Patent.  Patented June 6, 1916.

Application filed February 23, 1915. Serial No. 9,894.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Brakes, of which the following is a specification.

This invention relates to electro-pneumatic brakes, and more particularly to that type in which the brakes are controlled electrically by varying the pressure in the train brake pipe.

With the ordinary fluid pressure operated brakes, the triple valve parts will usually move to application position under a very light reduction in brake pipe pressure and if it is desired to release the brakes after such a reduction, there is oftentimes difficulty in obtaining a sufficinet differential of pressures to effect the movement of all the triple valves to release position and this is frequently the cause of what is known as stuck brakes.

If the reduction in brake pipe pressure is effected electrically, the possibility of the brakes failing to release is much greater, since under electric control, all of the brakes throughout the train will apply even with a very light brake pipe reduction, which might not be the case when the brake pipe reduction is effected pneumatically.

The possibility of the brakes failing to release after light reductions in brake pipe pressure evidently increases with the length of the train, so that on long trains, such as those employed in freight service, it is particularly necessary to obviate the difficulty.

The principal object of my invention is to provide means for insuring such a reduction in brake pipe pressure in making an application of the brakes that a release may thereafter be effected with certainty.

Figure 1:
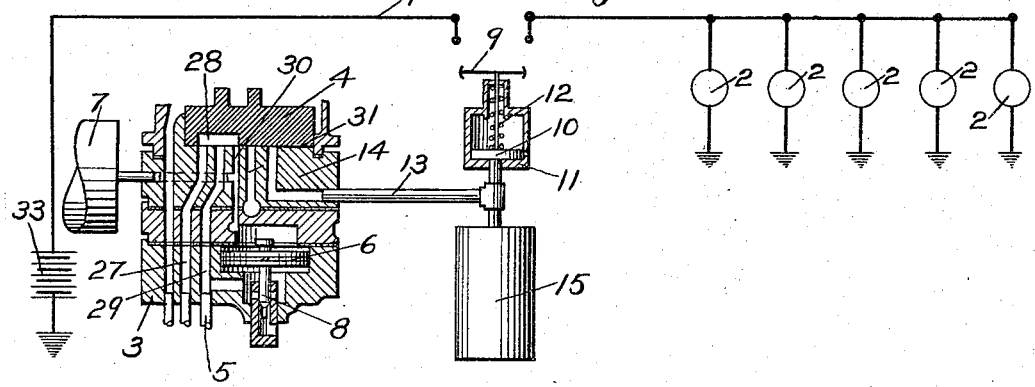
Figure 2:
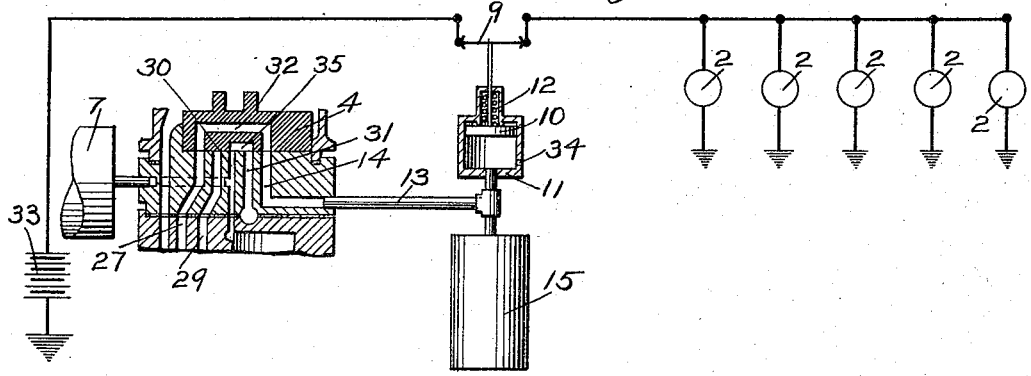
Figure 3:
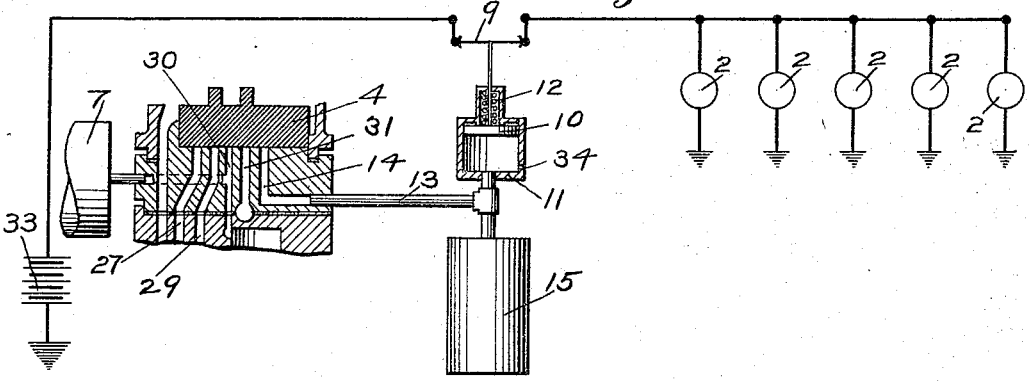

In the accompanying drawings; Figure 1 is a diagrammatic view of an electro-pneumatic brake applied to a train of cars, with my invention embodied therein, and showing the brake valve in running position; Fig. 2 a similar view, showing the brake valve in service application position; Fig. 3 a similar view, showing the brake valve in lap position; Fig. 4 a diagrammatic view of an electro-pneumatic brake equipment for a train, embodying a modified form of my invention, and showing the brake valve in running position; Fig. 5 a similar view, showing the brake valve in service application position; and Fig. 6 a sectional view of an electro-pneumatic brake equipment for a car, showing in detail how the application magnets illustrated diagrammatically in Figs. 1 to 5 may control applications of the brakes.

In Figs. 1, 2, and 3 of the drawings, there is shown an electro-pneumatic brake equipment for a train, comprising a brake application train wire 1 to which is connected the several car application magnets 2. On the head car or locomotive a brake valve 3 of the usual type may be provided having a rotary valve 4 for controlling the admission and release of fluid under pressure to and from the brake pipe 5 and an equalizing discharge valve mechanism comprising an equalizing piston 6 subject on one side to the pressure of an equalizing reservoir 7 and on the other to brake pipe pressure and a valve 8 operated by said piston for venting fluid from the brake pipe in making pneumatic service applications of the brakes.

According to the form of my invention shown in Figs. 1, 2, and 3, a switch 9 for controlling the application circuit wire 1 is provided and said switch is adapted to be operated by a piston 10 contained in a cylinder 11. A spring 12 acts on the piston 10 and tends to maintain the switch 9 in open position and the opposite side of the piston is connected by a pipe 13 and passage 14 to the seat of the rotary valve 4; the volume below the piston 10 being preferably augmented by a communicating reservoir 15.

The electro-pneumatic brake equipment on the car adapted to be controlled by the electro-magnet 2 may be as shown in Fig. 6 of the drawings, wherein the usual triple valve device is employed comprising a piston 16 contained in chamber 17 connected to brake pipe 5 and main slide valve 18 and auxiliary valve 19, contained in valve chamber 20, connected to auxiliary reservoir 21, the valves controlling the admission and release of fluid under pressure to and from brake cylinder 22. Release magnet 23 controls the triple valve exhaust passage 24 and application magnet 2 operates a valve 25 for venting fluid under pressure from the brake pipe 5 through passage 26 to the brake cylinder 22.

In operation, with the brake valve in running position, as shown in Fig. 1 of the drawings, the brake pipe is maintained charged with fluid under pressure from the main reservoir feed valve passage 27 which is connected by cavity 28 in the rotary valve 4 with brake pipe passage 29 and the equalizing reservoir 7, and the chamber above the equalizing piston 6 is also maintained charged through passage 30.

If it is desired to effect a service application of the brakes, the brake valve handle is turned to service application position, in which a cavity 35 in the rotary valve 4, as shown in Fig. 2, connects the equalizing reservoir side of piston 6 with atmospheric exhaust port 31 to effect a pneumatic reduction in brake pipe pressure by operation of the equalizing discharge valve in the usual manner.

According to my invention, in service application position, a cavity 32 in the rotary valve 4 connects feed valve passage 27 with passage 14, so that fluid under pressure is supplied to piston 10 and the reservoir 15. The piston 10 is thereupon actuated and the switch 9 is operated to close the application circuit 1, so that the source of current 33 is connected to the application magnets 2, which are thus simultaneously energized throughout the train. The valve 25 on each car is then opened to vent fluid from the brake pipe to the brake cylinder and thus effect the movement of the triple valve piston to application position.

When the brake valve handle is turned to lap position, the supply of fluid to the piston 10 is cut off, as shown in Fig. 3 of the drawings, and fluid will then exhaust to the atmosphere through a restricted port 34 in the cylinder 11. It will thus be seen that the switch 9 is held closed after the brake valve handle has been moved to lap position until the fluid pressure below the piston 10 and in reservoir 15 has been substantially exhausted, when the spring 12 will return the piston and the switch 9 to the open position. By this means the application circuit is maintained closed for a predetermined period of time regardless of the movement of the brake valve and dependent upon the size of the restricted port 34 and the volume of reservoir 15, and thus the application magnets 2 will hold the valves 25 open long enough to insure a substantial reduction in brake pipe pressure, so that the subsequent release of the brakes upon an increase in brake pipe pressure is assured.

According to the modified construction shown in Figs. 4 and 5 of the drawings, the usual equalizing discharge valve mechanism is dispensed with, an equalizing piston 40, however, being employed to operate a switch 41 for controlling the circuit through the application wire 1. The piston 40 is subject on one side to the pressure of the equalizing reservoir 7 and on the opposite side to brake pipe pressure, the stem 42, connecting the piston 40 with the switch 41, being arranged in a bearing adapted to prevent leakage from the brake pipe side of the piston.

In running position of the brake valve, the equalizing reservoir is charged with fluid under pressure from the feed valve passage as in the ordinary brake valve and in service position, as shown in Fig. 5, fluid is vented from the equalizing reservoir side of the piston 40 through passage 30 and cavity 35 to exhaust port 31. The higher brake pipe pressure acting on the under side of piston 40 then operates the piston and closes the switch 41.

The application magnets are thus energized to effect a reduction in brake pipe pressure on each car of the train and thereby the operation of the triple valves to cause an application of the brakes. When the brake valve is turned to lap position the preliminary exhaust port is closed and further reduction in equalizing reservoir pressure stopped. The magnet valves throughout the train continue to reduce the brake pipe pressure, until the brake pipe pressure acting below the piston 40 becomes slightly less than that in the equalizing reservoir, when the piston 40 will be forced downwardly so as to move the switch 41 to open position and thereby effect the deënergization of the application magnets. A predetermined reduction in brake pipe pressure throughout the train is thus assured, so that the brakes may be readily released thereafter.

In the position of the piston 40 with the switch 41 closed, as shown in Fig. 5 of the drawings, the piston preferably seats, so as to expose less than the full area of the piston to equalizing reservoir pressure, so that when the piston moves slightly from its seat, the full area is exposed to equalizing reservoir pressure which is slightly higher than the brake pipe pressure, and this causes the quick, prompt movement of the piston, so as to provide for the quick breaking of the electric contacts and thus prevent arcing.

In order to allow for differences in adjustment of parts, the switch 41 may have a relative movement against a spring 43, with respect to the piston 40, so that the seating of the piston is assured, through a slight relative movement of the switch on the stem 42.

Having now described my invention, what I claim as new and desire to secure by Letters Patent, is:

1. In an electrically controlled brake, the combination with a device operated electrically for effecting an application of the brakes, of means for automatically maintaining said device in the brake applying position for a period of time.

2. In an electrically controlled brake, the combination with devices operated electrically for effecting an application of the brakes, of means for automatically maintaining said devices in brake applying position for a predetermined period of time.

3. In an electrically controlled brake, the combination with devices operated electrically for effecting an application of the brakes and manually operated means for controlling said devices, of means adapted upon manually effecting the operation of said devices to apply the brakes, for automatically maintaining said devices in brake applying position for a predetermined period of time.

4. In an electro-pneumatic brake, the combination with a brake pipe, a valve device operated upon a reduction in brake pipe pressure for effecting an application of the brakes, and an electrically controlled device for effecting a reduction in brake pipe pressure, of means for automatically maintaining said device in position for reducing the brake pipe pressure for a predetermined period of time.

5. In an electro-pneumatic brake, the combination with a valve device operated upon a reduction in fluid pressure for effecting an application of the brakes and an electrically controlled device associated with said valve device for reducing the fluid pressure on said valve device, of means for automatically holding said electrically controlled device in position for reducing the fluid pressure for a predetermined period of time.

6. In an electro-pneumatic brake, the combination with a plurality of valve devices operated upon a reduction in fluid pressure for effecting an application of the brakes and an electrically controlled device associated with each valve device for effecting a reduction in fluid pressure thereon, of means for automatically maintaining said electrically controlled devices in the fluid pressure reducing position for a predetermined period of time.

7. In an electrically controlled brake, the combination with a plurality of devices operated electrically for applying the brakes, of a switch device for controlling the circuit of said electrically controlled devices, manually controlled means for effecting the operation of said switch device, and means for automatically maintaining said switch device in brake applying position for a predetermined period of time.

8. In an electro-pneumatic brake, the combination with a brake pipe and a plurality of electrically controlled devices operated upon energization for effecting a reduction in brake pipe pressure, of a switch for controlling the circuit of said devices, manually operated means for effecting the closure of said switch and means for automatically holding said switch closed for a predetermined period of time.

9. In an electro-pneumatic brake, the combination with a brake pipe and a plurality of electrically controlled devices operated upon energization for effecting a reduction in brake pipe pressure, of a fluid operated switch device for controlling the circuit of said electrically controlled devices, a manually operated valve device for varying the fluid pressure on said switch and means adapted upon operation of the switch device for automatically maintaining same in position for a predetermined period of time.

10. In an electro-pneumatic brake, the combination with a brake pipe and a plurality of electrically controlled devices operated upon energization for effecting a reduction in brake pipe pressure, of a switch controlling said circuit, a piston operated by fluid under pressure for closing said switch, a brake valve for supplying fluid to said piston, and a restricted port for permitting the gradual escape of fluid from said piston.

11. In an electrically controlled brake, the combination with a device controlled electrically for effecting an application of the brakes, of a switch for controlling the circuit of said device, a piston operated by fluid under pressure for closing said switch, a brake valve device for supplying fluid to said piston, and a restricted port for permitting the gradual escape of fluid from said piston, to thereby effect the opening of said switch after a predetermined period of time.

12. The combination with a brake pipe, of an electrically controlled device for venting fluid from the brake pipe and means for maintaining said device in the brake pipe venting position for a predetermined length of time.

13. The combination with a brake pipe, of an electrically controlled device for venting fluid from the brake pipe to effect a service application of the brakes, manually operated means for closing the circuit of said device, and means for maintaining the circuit closed for a predetermined period of time.

14. In an electro-pneumatic brake, the combination with a brake pipe and electric devices for effecting a reduction in brake pipe pressure, of a fluid pressure operated switch device for controlling the circuit of said devices and a brake valve device for supplying fluid under pressure to said switch device in service application position.

In testimony whereof I have hereunto set my hand.

WALTER V. TURNER.

Witnesses:
A. M. CLEMENTS,
S. W. KEEFER.